Figure 1:
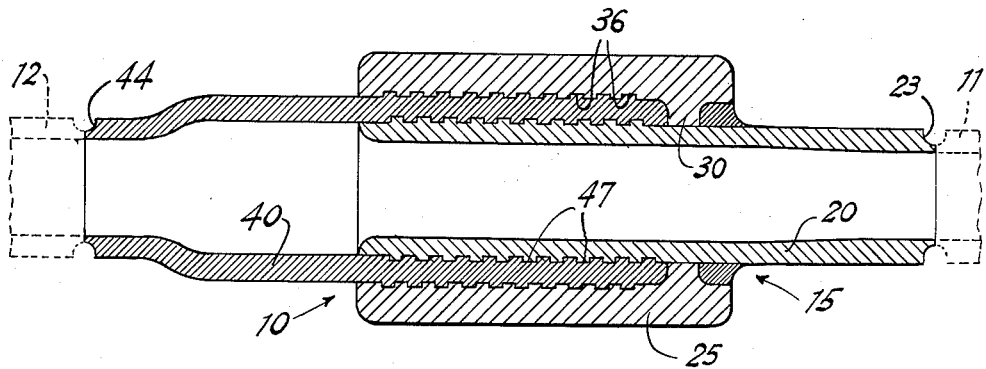

Jan. 30, 1962

W. G. MARSKELL  3,018,547
METHOD OF MAKING A PRESSURE-TIGHT MECHANICAL JOINT FOR
OPERATION AT ELEVATED TEMPERATURES

Filed July 29, 1953  3 Sheets-Sheet 1

INVENTOR
Walter G. Marskell
BY
*J. P. Moran*
ATTORNEY

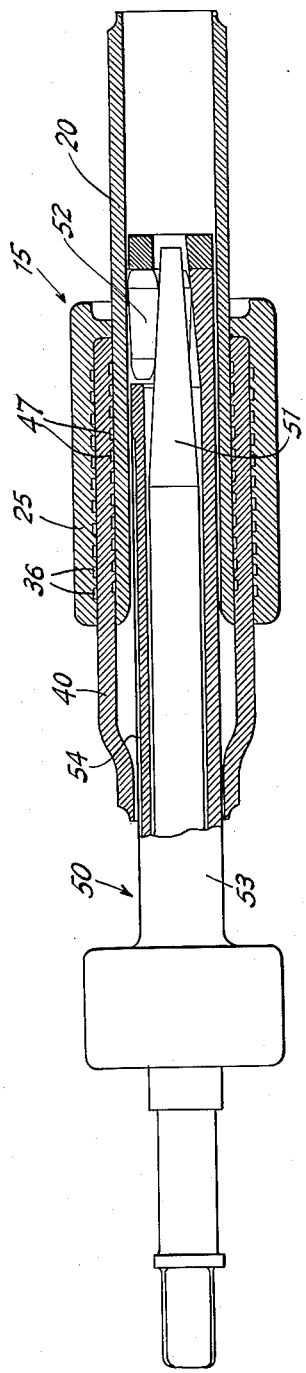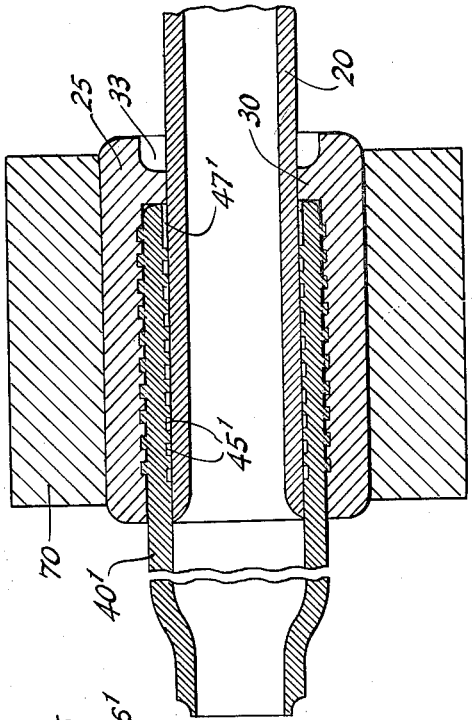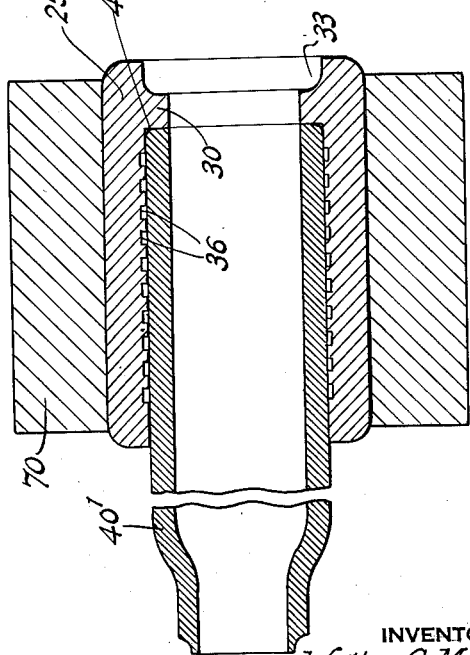

United States Patent Office 3,018,547
Patented Jan. 30, 1962

3,018,547
METHOD OF MAKING A PRESSURE-TIGHT MECHANICAL JOINT FOR OPERATION AT ELEVATED TEMPERATURES
Walter G. Marskell, Kilmacolm, Scotland, assignor to The Babcock & Wilcox Company, New York, N.Y., a corporation of New York
Filed July 29, 1953, Ser. No. 370,926
Claims priority, application Great Britain July 30, 1952
6 Claims. (Cl. 29—507)

This invention relates to a method of making pressure-tight joints between tubular elements required to operate at elevated temperatures and formed of steels having different coefficients of thermal expansion.

In order to improve the efficiency of steam turbine plants, progressively higher superheat pressures and temperatures have been adopted. Such high temperatures and pressures have introduced metallurgical problems, in the provision of reliable superheaters, which can be alleviated by the use of austenitic steels, such as 18 Cr-8 Ni steels. As these steels, however, are relatively expensive an advantage in cost can be gained by using an austenitic steel for a high temperature superheater and a ferritic steel, such as a 2¼ Cr steel, for an associated low temperature superheater. Such an arrangement may call for a substantial number of joints between austenitic and ferritic steel members. In any case, the introduction of a superheater or superheater section of austenitic steel into a system composed in general of ferritic steel involves joints between parts respectively of austenitic and ferritic steel.

The formation of joints between austenitic and ferritic members involves difficulties, as normal methods of joining parts of the same internal structure are inapplicable. These difficulties are due to the differences in the coefficients of thermal expansion of austenitic and ferritic members. In the case of welded joints between austenitic and ferritic members, further differences arise due to local variations in composition of the metal at the welded joint. One serious factor is carbon migration at the welded joint which leaves carbon depleted zones subject to failure. The provision of a satisfactory joint between austenitic and ferritic members is therefore a matter of considerable importance.

The present invention is directed to a method of making a pressure-tight joint between tubular elements respectively of steels having different coefficients of thermal expansion and required to operate at elevated temperatures, which method includes the steps of forming one of the elements with an annular, axially extending pocket, enclosing a portion of the second element in the pocket and effecting a flow of metal causing intimate contact between circumferentially continuous surfaces of the respective elements both at the radially inner interior surface and at the radially outer interior surface of the pocket.

The invention is also directed to a pressure-tight joint between tubular elements respectively of steels having different coefficients of thermal expansion and comprising an annular, axially extending pocket formed in a first element and housing a length of the second element at least one circumferentially continuous part of the outer surface of which length is in intimate contact with the radially outer interior surface of the pocket and at least one circumferentially continuous part of the inner surface of which length is in intimate contact with the radially inner interior surface of the pocket, and locking means adapted to inhibit relative longitudinal movement of the elements.

For an understanding of the invention principles, reference is made to the following description of typical embodiments thereof as illustrated in the accompanying drawings.

Figure 2:
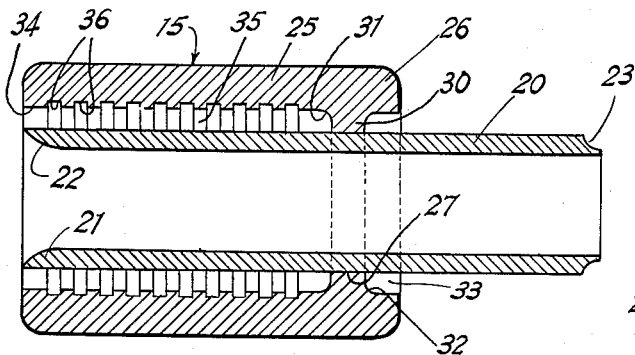
Figure 3:
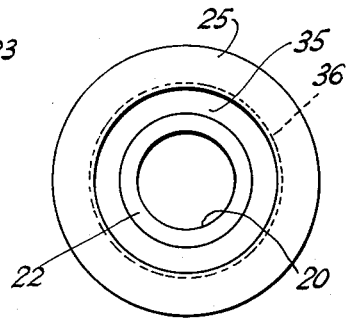
Figure 4:
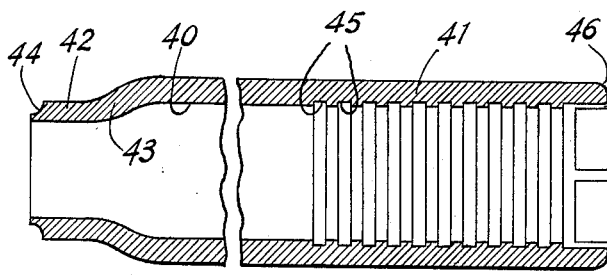
Figure 5:
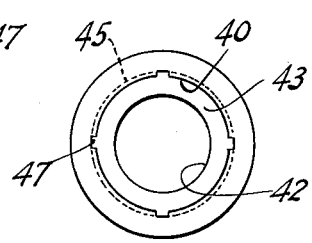
Figure 7:
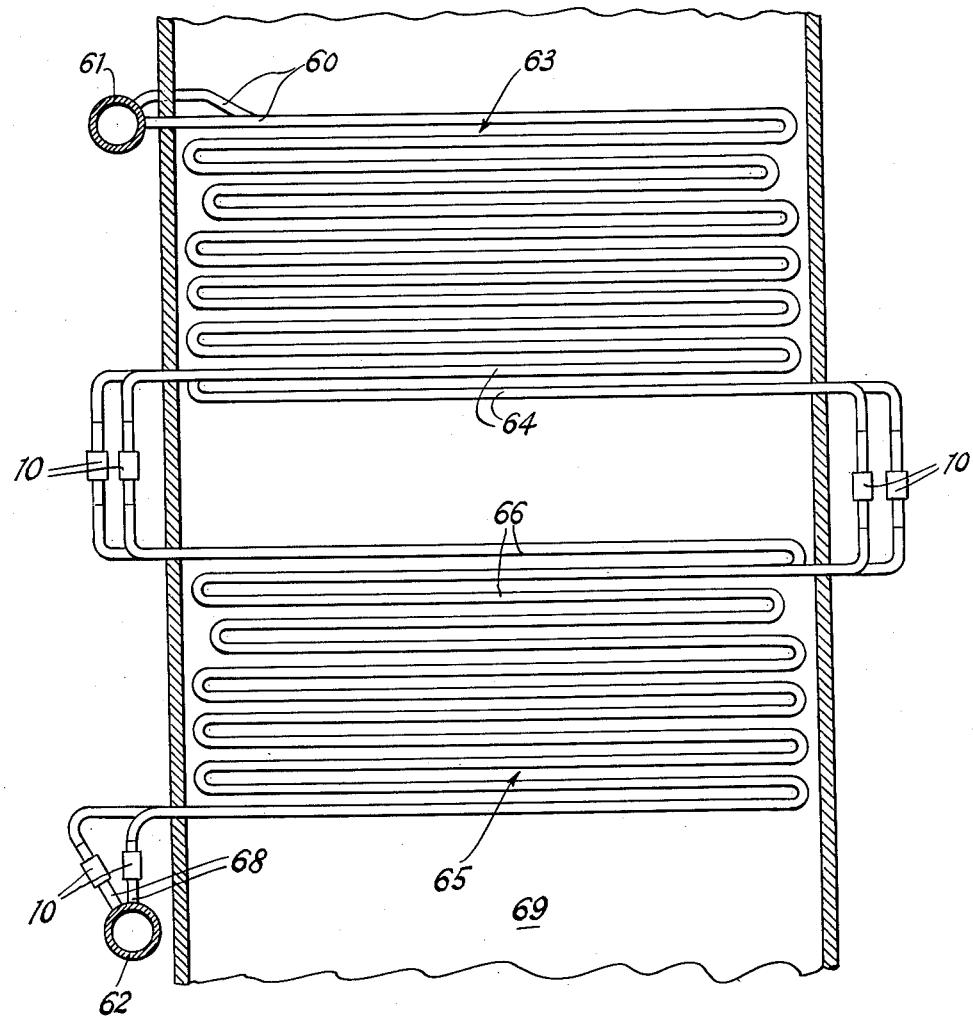

In the drawings:
FIG. 1 is a longitudinal sectional view through two dissimilar tubular steel elements united by the invention joint;
FIG. 2 is a longitudinal sectional view through one of the tubular elements shown in FIG. 1 and comprising an assembly of a tube length and a collar;
FIG. 3 is an end view of the elements shown in FIG. 2 looking from the left of the latter figure;
FIG. 4 is a longitudinal sectional view through the other tubular element shown in FIG. 1;
FIG. 5 is an end view of the tubular element shown in FIG. 4 looking from the right of the latter figure;
FIG. 6 is a longitudinal sectional view through the two tubular elements immediately prior to their being joined together;
FIG. 7 is a vertical sectional view through the superheater section of a vapor generator incorporating the invention joint; and
FIGS. 8 and 9 are views similar to FIG. 6 illustrating a modified embodiment of the invention method and joint.

Referring to FIGS. 1–5 of the drawings, the invention joint 10 is illustrated as jointing a first tubular element 15 of a ferritic steel and a secondary tubular element 40 of an austenitic steel.

The tubular element 15 comprises a tube length 20 and a collar 25. The tube length 20 (see FIG. 2) is originally of uniform internal diameter and of uniform thickness throughout practically its whole length. Near one end 21, however, its internal diameter gradually increases towards the end of the tube length, as shown at 22, while at its opposite end, the element is cut away circumferentially as indicated at 23 to provide one side of a welding groove to facilitate welding of the tube length to an adjacent tubular member, indicated by dotted lines at 11 in FIG. 1, also made of ferritic steel.

The collar 25 which, as is shown in FIG. 2, is assembled onto the tube length 20 before the jointing of the tubular elements 15 and 40, is of generally cylindrical form and is provided near one end 26 with an internal annular flange 30, affording an opening 27 fitting the outside of the tube length 15 and providing on its inner side a curved shoulder 31 and providing on its outer side a curved shoulder 32 defining the bottom of a welding groove 33. The inner surface 34 of the collar is formed with a series of circumferential, longitudinally spaced grooves 36. It will be seen that the inner surface 34 and the curved shoulder 31 of the collar 25 and the opposed exterior surface of the tube length 20 together define an annular, axially extending pocket 35 formed in the first tubular element 15.

The tubular element 40 consists of a main part 41 (see FIG. 4) of uniform outside diameter and an end part 42 of lesser diameter joined to the main part by a neck 43, the diameter of which gradually increases towards the main part 41. The end part 42 is cut away circumferentially as indicated at 44 to provide one side of a welding groove to facilitate welding of the element 40, when desired, to an adjacent tubular member indicated by dotted lines at 12 in FIG. 1 and also made of an austenitic steel. The main part 41 is formed with a curved end 46 complementary to the curved shoulder 31 on the collar 25.

The tubular element 40 is formed internally with a number of shallow circumferential grooves 45 of rectangular cross-section and spaced evenly along a portion of the main part 41. In one example of the joint, which has proved satisfactory in practice, the interior surface 34 of the collar 25 has a diameter of a little over two inches, and there is a series of twelve circumferential grooves 36 of rectangular cross-section having a pitch of ¼ inch, a width of ⅛ inch and a depth of ¹⁄₃₂ inch; the thickness of the wall of the collar 25 is approximately twice that of the tube length 20; the internal bore of the end part 42 of element 40 was 1⅛ inches, and the grooves 45 have have a pitch of ¼ inch, being ⅛ inch wide and ¹⁄₃₂ inch deep. However, a short part of the internal surface of the main part, adjacent the end 46 of the element, is left free from such circumferential grooves, but is formed with four longitudinally extending grooves 47, equally spaced about the inner circumference of the element, and extending from the end 46 of the element as far as the nearest of the circumferential grooves 45. The grooves 47 are of the same depth as the grooves 45.

FIG. 6 illustrates one method of forming a fluid-tight joint between the two elements. First the ferritic tube length 20 is threaded through the internal annular flange 30 of the collar 25 to the proper extent (as shown in FIG. 2) and the end 46 of the second tubular element 40 pushed home into the pocket 35 so formed to bring the end 46 into contact with the shoulder 31 of the collar 25. The parts 20, 25 and 40 are so dimensioned that upon positioning the parts as shown in FIG. 6, the grooves 36 in the radially outer interior surface of the pocket 35 are staggered by a half pitch in relation to the grooves on the inner surface of the second tubular element 40. An initial expanding operation of the tube length 20 is then carried out sufficient to nip tube length 20, the collar 25 and the tubular element 40 together in their correct relative positions. Advantageously, the expansion is effected by means of a retractive tube expander, and FIG. 6 shows a retractive tube expander 50 inserted into the tube length 20 in readiness for the expanding operation. Such a tube expander is disclosed in the specification of United States Patent No. 2,630,853.

The actual nipping operation is initiated by first causing axial movement of the mandrel 51 to bring the rollers 52 into contact with and to swell the end part of the tube length 20 which lies within the collar 25 and beyond the annular flange 30, by rotation of the mandrel while the thrust member 53 is held against rotation, and then permitting rotation of the thrust member 53 and the body part 54 of the tube expander, whereupon the tube length 20 is expanded locally radially and (due to the inclination of the slots and rollers in the body part 54) the body part 54 is moved outwardly along the tube length 20, progressively expanding radially that part of the tube length 20 within the collar 25 into contact with the inner surface of the second tubular element 40 and with the inner surface of the internal annular flange 30 of the collar 25.

When the nipping operation is completed, the tube expander is withdrawn and the collar 25 and the tube length 20 are united by the deposition of weld metal in the groove 33 in well known manner. The welding operation is followed by a stress-relieving operation.

Subsequently, the expander 50 is reinserted into the tube length 20 and given a second pass through the part of the tube length within the collar 25. During this pass, the inner wall of the pocket 35, constituted by part of the tube length 20, is expanded in relation to the portion of the second tubular element 40 within the pocket, and this portion is expanded in relation to the outer wall of the pocket 35, constituted by part of the collar 25.

This final expansion effects intimate contact between the portion of the second tubular element 40 and the inner surface of the pocket, causing metal of the inner wall of the pocket to flow into the grooves 45 and 47 in the inner surface of the second tubular member and metal of that member to flow into the grooves 36 formed in the inner surface of the collar 25, which forms the outer wall of the pocket 35, so that relative rotational or longitudinal movements of the tubular elements are inhibited.

It will be seen that by the expanding operation a plurality of circumferentially continuous areas of intimate contact are established between the inner surface of the second tubular element 40 and the outer surface of the tube length 20, and between the outer surface of the second tubular element 40 and the inner surface of the collar 25. These areas of intimate contact inhibit leakage of pressure fluid from the inside to the outside of the joint. Moreover, when in operation, a tube of which the joint forms a part is raised to an elevated temperature, since the coefficient of expansion of the tubular element 40 is greater than that of the collar 25, the pressure between the element 40 and the collar 25 in the circumferential area of contact already referred to becomes even greater. Upon cooling of the joint, the part of the tubular element 40 within the collar shrinks onto the inner wall of the pocket, constituted by the tube length 20. Thus a tight joint is maintained at all times.

It will be understood that the above jointing operations will normally be effected in a factory of workshop and that the jointing of the coupled tubular elements 15 and 40 to associated tubular parts 11 and 12 by electric fusion welding will normally be effected at site.

FIG. 7 illustrates a superheater forming part of a tubulous vapor generating and superheating unit, in which a plurality of superheating tubes 60 are connected at their ends to inlet and outlet headers 61 and 62, respectively, formed of ferritic steel. The superheater comprises a low temperature primary section 63 formed by tubular members 64 made of a ferritic steel and connected to the inlet header 61 and a high temperature secondary section 65 formed by tubular members 66 made of an austenitic steel. Each tube 60 comprises a tubular member 64 and a tubular member 66 having their adjacent ends connected together by a joint 10 similar to that described above in connection with FIGS. 1 to 6, and the lower end of each tubular member 66 is connected by a similar joint 10 to a ferritic stub tube 68 suitably connected to the outlet header 62. The joints 10 are disposed outside a gas pass 69 in which the superheater is arranged, so that the joints 10 are shielded from contact with the hot gases.

In operation, hot gases flow upwardly first over the secondary section 65 formed of the austenitic steel and then over the primary section 63 formed of the ferritic steel.

An alternate method of forming a fluid-tight joint between the two elements has been found desirable when the tubular elements to be joined are exceptionally thick. In the alternative method, which is shown in FIGS. 8 and 9, the austenitic tubular element 40' is similar to the tubular element 40, with the exeception that the grooves 45 and 47 are omitted, and the collar of the ferritic steel is formed similarly to the collar 25. The tubular element 40' is pushed home into the collar 25 from the left-hand side (as viewed in FIG. 8) to bring the end 46' into contact with the shoulder 30 of the collar 25. A mild steel support ring 70 is fitted onto the outside of the collar 25, and the austenitic tubular element 40' is fully expanded into the collar 25. The interior of the tubular element 40' is then machined to provide the grooves 45' and 47'. The ferritic tubular member 20 is threaded through the internal annular flange 30 of the collar 25 from the right-hand side of the collar (as viewed in FIG. 9) to the proper extent to form with the collar 25 a pocket containing the end part of the tubular element 40' and is fully expanded in the austenitic tubular element 40'. One end of the collar 25 and the tube length 20 are united by the deposition of weld metal in the groove 33, and a final expanding operation given to the whole assembly. The support ring 70 is then removed.

While a specific embodiment of the invention has been shown and described in detail to illustrate the application of the invention principles, it will be understood that the invention may be embodied otherwise without departing from such principles.

What is claimed is:

1. The method of making a pressure tight joint, for long time service at elevated temperatures of the order of 1000° F. and greater, uniting two tubular elements respectively of steels having different coefficients of thermal expansion comprising forming the element having the lower coefficient of thermal expansion with an annular, axially extending pocket having an integrally sealed base; circumferentially grooving the inner surface of the radially outer wall of the pocket and the inner surface of a length of the other element having the higher coefficient of thermal expansion; inserting such grooved length of the other element into the pocket; and plastically expanding the inner wall of the pocket to flow the metal in the outer surface thereof into the grooves in the inner surface of the length of said other element and to flow the metal in the outer surface of the length of said other element into the grooves in the inner surface of the outer wall of the pocket whereby a joint is produced that when subjected to a temperature increase said second element having the higher coefficient of expansion will expand within the pocket and form a tighter seal with the inner surface of the outer wall of the pocket and when subjected to a temperature decrease said second element having the higher coefficient of expansion will contract within the pocket and form a tighter seal about the outer surface of the inner pocket wall.

2. A method as claimed in claim 1 in which said other element having the higher coefficient of thermal expansion is formed of austenitic steel and said element having the lower coefficient of thermal expansion is formed of ferritic steel.

3. A method as claimed in claim 2, including the additional steps of subsequently welding said austenitic element to an austenitic member and said ferritic element to a ferritic member.

4. The method of making a pressure-tight joint, for long time service at elevated temperatures of the order of 1000° F. and greater uniting two tubular elements respectively of steels having different coefficients of thermal expansion comprising forming the element having the lower coefficient of thermal expansion with an annular, axially extending pocket having an integrally sealed base; circumferentially grooving the inner surface of the radially outer wall of the pocket and the inner surface of a length of the other element, having the higher coefficient of thermal expansion; inserting such grooved length of the other element into the pocket so that the grooving in such length is longitudinally staggered relative to the grooving in the pocket outer wall; and plastically expanding the inner wall of the pocket to flow the metal in the outer surface thereof into the grooves in the inner surface of the length of said other element and to flow the metal in the outer surface of the length of said other element into the grooves in the inner surface of the outer wall of the pocket whereby a joint is produced that when subjected to a temperature increase said second element having the higher coefficient of expansion will expand within the pocket and form a tighter seal with the inner surface of the outer wall of the pocket and when subjected to a temperature decrease said second element having the higher coefficient of expansion will contract within the pocket and form a tighter seal about the outer surface of the inner pocket wall.

5. The method of making a pressure-tight joint, for long time service at elevated temperatures of the order of 1000° F. and greater, uniting two tubular elements respectively of steels having different coefficients of thermal expansion comprising inserting a length of the element having the higher coefficient of thermal expansion through an elongated tubular collar formed of the steel of the other element, and having a plurality of axially spaced circumferential grooves in its inner surface and an internal circumferential rib intermediate its ends, from one end of the collar, the rib limiting movement of the inserted element through the collar; expanding the inserted element length to effect a flow of metal providing intimate contact between circumferentially continuous surfaces of the element length and the collar while circumferentially restraining the collar; circumferentially grooving the inner surface of the inserted element length at axially spaced locations; inserting a tubular length of the steel of the other element through the other end of the collar and into the expanded length to form, with the collar, a pocket for such expanded length; plastically expanding the inner wall of the pocket to flow the metal in the outer surface thereof into the grooves in the inner surface of the length of said other element and to flow the metal in the outer surface of the length of said other element into the grooves in the inner surface of the outer wall of the pocket whereby a joint is produced that when subjected to a temperature increase said second element having the higher coefficient of expansion will expand within the pocket and form a tighter seal with the inner surface of the outer wall of the pocket and when subjected to a temperature decrease said second element having the higher coefficient of expansion will contract within the pocket and form a tighter seal about the outer surface of the inner pocket wall; and welding the last expanded length to said collar beyond the first inserted length to provide an integrally sealed base for the pocket.

6. The method of making a pressure-tight joint, for long time service at elevated temperatures of the order of 1000° F. and greater, uniting two tubular elements respectively of steels having different coefficients of thermal expansion comprising forming the first element having the lower coefficient of thermal expansion by inserting a tube length through an elongated tubular collar of the same material and having an inner diameter greater than the outer diameter of the tube length, a plurality of axially spaced circumferential grooves in its inner surface, and an internal circumferential rib intermediate its length extending into engagement with the tube length to provide said first element with an annular axially extending pocket; circumferentially grooving the inner surface of the second element having the higher coefficient of thermal expansion at axially spaced locations along a length adjacent one end; inserting such length of the second element into the pocket; effecting an initial expanding operation to nip the elements together; welding the collar to the tube length of the first element beyond said second element to provide the pocket with an integrally sealed base; and then plastically expanding the inner wall of the pocket to flow the metal in the outer surface thereof into the grooves in the inner surface of the length of said other element and to flow the metal in the outer surface of the length of said other element into the grooves in the inner surface of the outer wall of the pocket whereby a joint is produced that when subjected to a temperature increase said second element having the higher coefficient of expansion will expand within the pocket and form a tighter seal with the inner surface of the outer wall of the pocket and when subjected to a temperature decrease said second element having the higher coefficient of expansion will contract within the pocket and form a tighter seal about the outer surface of the inner pocket wall.

References Cited in the file of this patent

UNITED STATES PATENTS

| | | |
|---|---|---|
| 689,455 | Bickford | Dec. 24, 1901 |
| 1,648,392 | Fuetterer | Nov. 8, 1927 |

(Other references on following page)

UNITED STATES PATENTS

| | | |
|---|---|---|
| 1,738,915 | Mueller | Dec. 10, 1929 |
| 2,080,374 | McAllister | May 11, 1937 |
| 2,089,790 | Halpern | Aug. 10, 1937 |
| 2,092,358 | Robertson | Sept. 7, 1937 |
| 2,165,622 | Donahue | July 11, 1939 |
| 2,175,412 | Rodman | Oct. 10, 1939 |
| 2,228,018 | Scholtes | Jan. 7, 1941 |
| 2,228,087 | Rose | Jan. 7, 1941 |
| 2,252,274 | Rossheim | Aug. 12, 1941 |
| 2,266,796 | Parker | Dec. 23, 1941 |
| 2,301,495 | Abegg | Nov. 10, 1942 |
| 2,335,414 | Hinrichs | Nov. 30, 1943 |
| 2,375,741 | Dibner | May 8, 1945 |
| 2,429,076 | Sery | Oct. 14, 1947 |
| 2,721,379 | Chapman | Oct. 25, 1955 |
| 2,763,923 | Webb | Sept. 25, 1956 |
| 2,769,227 | Sykes et al. | Nov. 6, 1956 |

FOREIGN PATENTS

| | | |
|---|---|---|
| 511,483 | Belgium | June 14, 1952 |
| 367,026 | Great Britain | Feb. 15, 1932 |